United States Patent
Mizubata et al.

(10) Patent No.: US 6,888,650 B1
(45) Date of Patent: May 3, 2005

(54) APPARATUS AND METHOD FOR READING DOCUMENT

(75) Inventors: Tsuyoshi Mizubata, Tokyo (JP); Masanobu Kawano, Tokyo (JP); Kiyoshi Hata, Tokyo (JP); Koji Ogino, Yamanashi-ken (JP); Kazuhide Sano, Yamanashi-ken (JP); Sei Takahashi, Yamanashi-ken (JP); Ichitaro Kubota, Yamanashi-ken (JP)

(73) Assignees: Konica Corporation, Tokyo (JP); Nisca Corporation, Yamanashi (JP)

( * ) Notice: Subject to any disclaimer, the term of this patent is extended or adjusted under 35 U.S.C. 154(b) by 730 days.

(21) Appl. No.: 09/704,880

(22) Filed: Nov. 2, 2000

(30) Foreign Application Priority Data

Nov. 15, 1999 (JP) .......................................... 11-324455

(51) Int. Cl.[7] ................................................. H04N 1/04
(52) U.S. Cl. ........................ 358/488; 358/489; 358/1.2; 358/496; 382/289; 382/290
(58) Field of Search ................................ 358/488, 489, 358/474, 1.13, 1.14, 1.15, 401, 403, 448, 496, 1.2, 1.5, 3.12, 505, 514, 449, 462; 382/289, 286, 290, 296; 271/227

(56) References Cited

U.S. PATENT DOCUMENTS

| | | | |
|---|---|---|---|
| 4,511,242 A | * 4/1985 | Ashbee et al. | 399/395 |
| 4,926,490 A | * 5/1990 | Mano | 382/177 |
| 5,517,587 A | * 5/1996 | Baker et al. | 382/296 |
| 5,784,680 A | * 7/1998 | Taruki | 399/374 |
| 5,854,964 A | * 12/1998 | Atsumi | 399/371 |
| 5,918,877 A | * 7/1999 | Takei et al. | 271/261 |
| 6,154,286 A | * 11/2000 | Konno et al. | 358/1.13 |
| 6,310,984 B2 | * 10/2001 | Sansom-Wai et al. | 382/289 |
| 6,408,094 B1 | * 6/2002 | Mirzaoff et al. | 382/224 |
| 6,771,842 B1 | * 8/2004 | Sakai et al. | 382/290 |
| 2003/0024792 A1 | * 2/2003 | Yoshida et al. | 198/401 |

* cited by examiner

Primary Examiner—Kimberly Williams
Assistant Examiner—Negussie Worku
(74) Attorney, Agent, or Firm—Frishauf, Holtz, Goodman & Chick, P.C.

(57) ABSTRACT

A document reading apparatus and method are provided for outputting an image faithful to a document as possible even if the document is accidentally fed in an oblique fashion on the way of a sheet feeding path. For this purpose, a plurality of document end detecting sensors S1 to S3 are disposed on the way of the sheet feeding path 5, and further, a reading controller 20 calculates a skew quantity $\theta$ of the document with respect to the sheet feeding path 5 based on a signal output from the document end detecting sensor, thereby adjusting a document reading timing in accordance with the skew quantity.

6 Claims, 7 Drawing Sheets

APPARATUS AND METHOD FOR READING DOCUMENT

BACKGROUND OF THE INVENTION

1. Field of the Invention

The present invention relates to a document reading apparatus and method for reading a document which is fed onto a platen glass in an image processor such as an electrophotographic copying machine or an image scanner.

2. Description of the Prior Art

An automatic document feeding mechanism for automatically feeding a document to an image reader is used in an image processor such as an electrophotographic copying machine.

FIG. 1 shows one example of a conventional document reading apparatus. A document feeding mechanism 1 is mounted on an image processor unit 2, and is provided with a sheet feeding path 5, on which a document is fed onto a platen glass 4 from a sheet feeding tray 3 mounting the document thereon. The document fed from the sheet feeding tray 3 along the sheet feeding path 5 by supplying means, not shown, is fed by a feed roller 6 via the platen glass 4. The document is read by an image reader 7 in the image processor unit 2 while passing the platen glass 4, and then, is discharged to a sheet discharging tray 8 via a sheet discharging path 14 by the feed roller 6 and other feeding means, not shown.

A document end detecting sensor 9 is disposed upstream of the platen glass 4 on the sheet feeding path 5. The document end detecting sensor 9 is a photosensor of a reflection type, which sends a signal to a reading controller 20 in the image processor unit 2 upon detecting that the document fed by the feed roller 6 reaches a position of the document end detecting sensor 9.

The size of the document can be detected by a sensor, not shown, disposed in the sheet feeding tray 3 or on the sheet feeding path 5.

The reading controller 20 controls a reading timing of the image reader 7 in response to the signal sent from the document end detecting sensor 9. This control will be specifically explained below in reference to FIG. 2.

FIG. 2 illustrates the sheet feeding path 5 of FIG. 1 on a plane, wherein the sheet feeding path 5 is illustrated by an arrow indicative of its feeding direction.

The document end detecting sensor 9 is disposed upstream of the platen glass 4. A document 10 of a rectangle ABCD is fed along the sheet feeding path 5. As soon as a side "a" at the leading end of the document 10 reaches the document end detecting sensor 9, the sensor 9 outputs a detection signal. The reading controller 20 allows the image reader 7 to start reading after a lapse of a predetermined time after reception of the detection signal output from the sensor 9. Here, the predetermined time signifies a time taken to feed the document 10 by a distance "d" from a straight line L drawn on a detection point of the sensor 9 to the platen glass 4.

Since the size of the document 10 is previously detected, the reading controller 20 finishes the reading operation by the image reader 7 after a lapse of time corresponding to the length of the document 10 in the feeding direction. In other words, the image reader 7 is operative only for a period after the side "a" at the leading end of the document 10 reaches the platen glass 4 until a side "b" at a trailing end thereof reaches the platen glass 4.

In the case where the document 10 is obliquely fed in the above-described image reading apparatus, there may occur such inconveniences as described below.

As shown in FIG. 3, when the side "a" at the leading end of the document 10 fed obliquely to the sheet feeding path 5 crosses the straight line L drawn on the detection point of the document end detecting sensor 9, the sensor 9 detects the side "a" of the document 10. The reading controller 20 allows the image reader 7 to start the reading operation after a lapse of the predetermined time from that timing.

Thereafter, the reading controller 20 allows the image reader 7 to finish the reading operation at a timing at which a time corresponding to the length of the document which would be fed straight in the feeding direction elapses since the image reader 7 once starts the reading operation.

Namely, it is a region 11 indicated by a two-dot chain line in FIG. 3 that is actually read by the image reader 7. As a result, with respect to the obliquely fed document 10, only a portion overlapping with the region 11 is read. That is, a hatched portion 11a of the document 10 cannot be read, or is a deficiently read region.

In this manner, since there occurs the hatched, deficient region 11a, there arises a problem of a deficiently output image. In particular, in the case where a skew quantity, i.e., obliqueness is large, the deficiently read region 11a becomes large, and therefore, the deficiency of the output image becomes large accordingly.

In view of this, there has been another image processor in which a skew quantity of a document is detected, a read image is restored by rotating by the skew quantity, and then, is output. Nevertheless, however the output image may be rotated, a deficient portion at the time of a reading operation cannot be output. Namely, a partly deficient image is output straight at the best.

SUMMARY OF THE INVENTION

An object of the present invention is to provide a document reading apparatus and method for outputting an image faithful to a document by reducing a deficient portion of an output image as possible even if the document is accidentally fed in an oblique fashion on the way of a feeding path.

A first invention is featured in that a document reading apparatus comprises: a sheet feeding path on which a document is fed onto a platen glass; an image reader for reading the document to be fed onto the platen glass; a sheet discharging path disposed downstream of the platen glass; skew quantity calculating means for calculating a skew quantity of the document with respect to the sheet feeding path; and a reading controller for controlling a reading timing by the image reader; wherein the reading controller sets a document read region according to the skew quantity calculated by the skew quantity calculating means.

Here, the skew quantity signifies a degree of obliqueness with respect to a normally document feeding direction, and is expressed by, for example, an angle formed between a side at the leading end of the document and a straight line perpendicular to the feeding direction.

On the premise of the first invention, a second invention is featured in that the skew quantity calculating means includes a plurality of document end detecting sensors provided on the way of the sheet feeding path, for detecting the leading end of the document in the feeding direction, and the reading controller, and the reading controller calculates the skew quantity of the document with respect to the sheet feeding path based on a deviation of detection timings of the plurality of document end detecting sensors.

A third invention is featured in that a document reading apparatus comprises: a sheet feeding path on which a document is fed onto a platen glass; an image reader for reading the document to be fed onto the platen glass; a sheet discharging path disposed downstream of the platen glass; skew quantity calculating means for calculating a skew quantity of the document with respect to the sheet feeding path; and a reading controller for controlling a reading timing by the image reader; wherein the reading controller does not read the document in the case where the skew quantity calculated by the skew quantity calculating means exceeds a preset allowable value; in contrast, it controls a document reading starting timing to read the document by referring to a detection timing of any one of a plurality of document end detecting sensors only in the case where the skew quantity ranges within the allowable value.

According to the above-described invention, in the case where the reading operation cannot be performed since the skew quantity exceeds the allowable value, a user is informed of that matter by a display of an error message or the like, so that the document is discharged through the sheet feeding path or the sheet discharging path.

On the premise of the third invention, a fourth invention is featured in that the skew quantity calculating means includes a plurality of document end detecting sensors provided on the way of the sheet feeding path, for detecting the leading end of the document in the feeding direction, and the reading controller, and the reading controller calculates the skew quantity of the document with respect to the sheet feeding path based on a deviation of detection timings of the plurality of document end detecting sensors.

On the premise of the third and fourth inventions, a fifth invention is featured in that there are provided a pair of document end detecting sensors respectively having first and second detection points on a first straight line perpendicular to a document feeding direction; there is provided a third document end detecting sensor having a third detection point on a straight line passing one of the first and second detection points downstream of the first straight line while keeping an angle between the first straight line and the same within a preset allowable value; and a reading controller judges that a skew quantity of a document exceeds the allowable value in the case where the third document end detecting sensor detects a document end after only one of the pair of document end detecting sensors detects the document end and before the other document end detecting sensor detects the document end.

On the premise of the third to fifth inventions, a sixth invention is featured in that in the case where a region corresponding to the size of the document fed on a sheet feeding path is a region to be read and the document is fed while keeping the skew quantity within the allowable value with respect to the sheet feeding path, the image reader adjusts a reading starting timing in such a manner that deficiently read regions lapping from the read region become uniform before and after the document with respect to the feeding direction.

DETAILED DESCRIPTION OF THE PREFERRED EMBODIMENTS

The present invention will now be described below in reference to the drawings.

Figure 1:
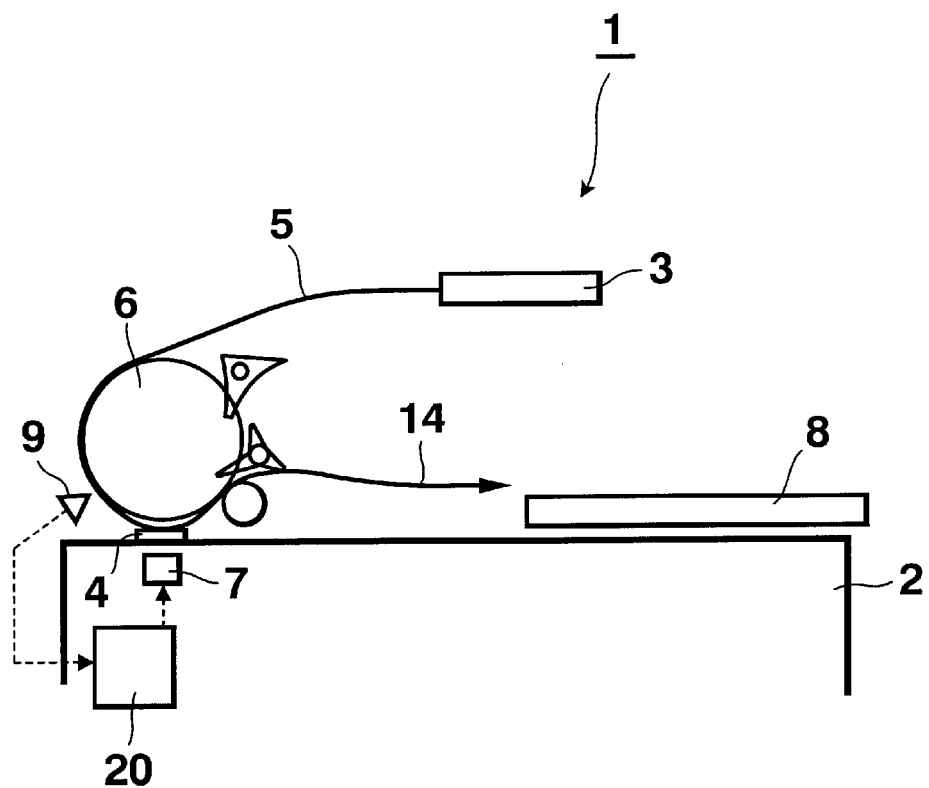
FIG. 1 is a general view showing one example of a document reading apparatus in the prior art.
Figure 2:
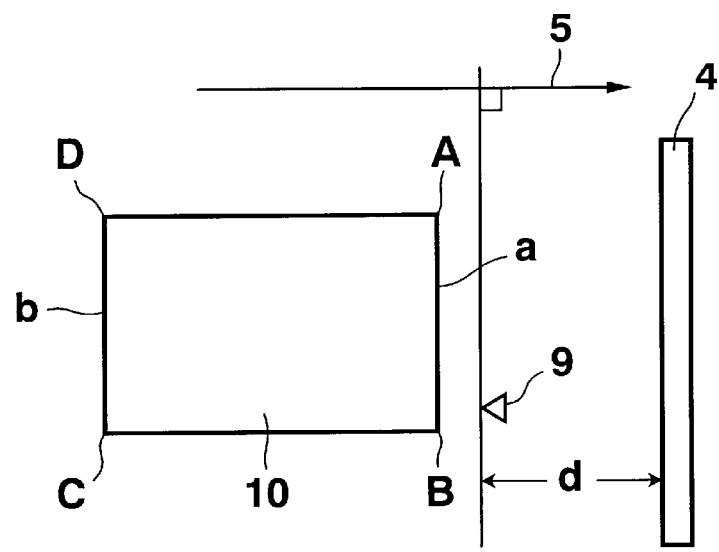
FIG. 2 is a view illustrating a document fed straight in the document reading apparatus of the prior art shown in FIG. 1.
Figure 3:
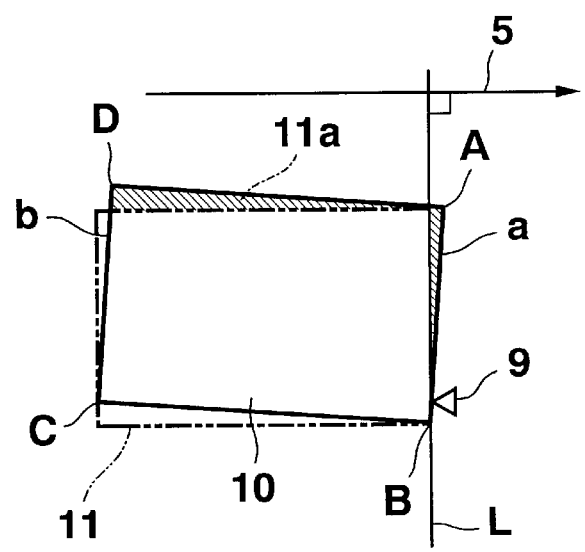
FIG. 3 is a view illustrating a document fed obliquely in the document reading apparatus of the prior art.
Figure 4:
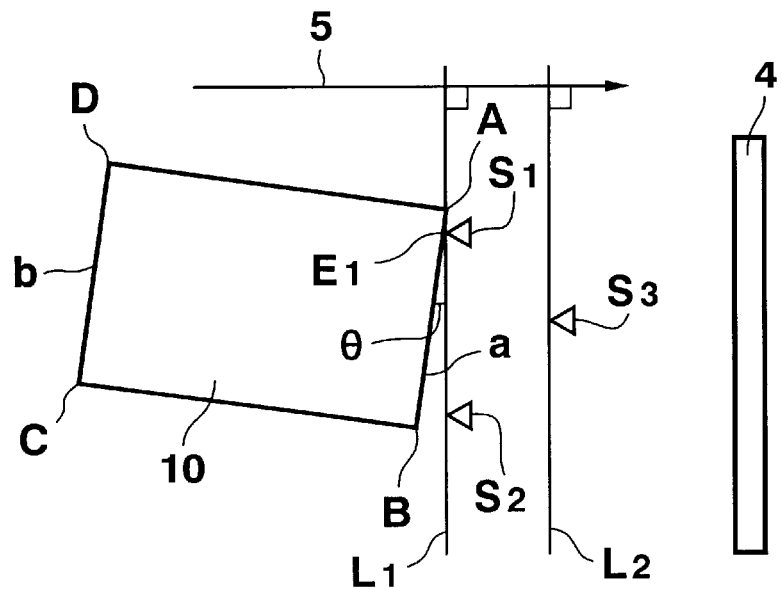
FIG. 4 is a view illustrating a document feeding state in a document reading method in a first embodiment according to the present invention.
Figure 5:
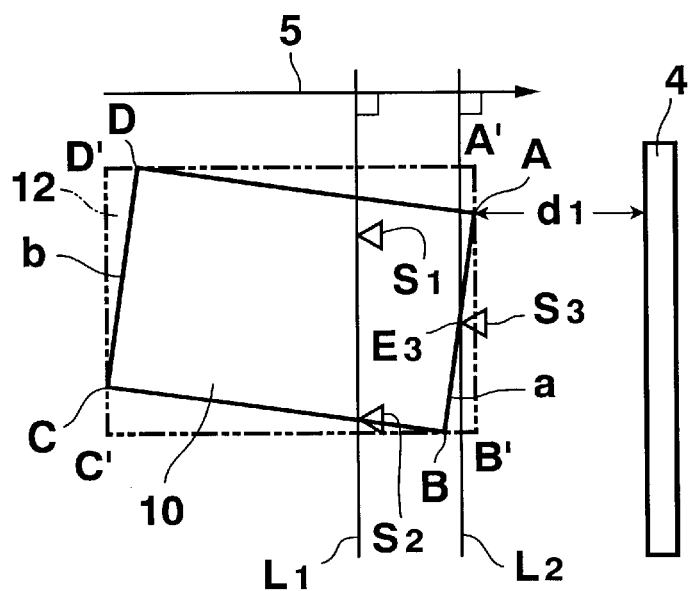
FIG. 5 is a view illustrating the state in which the document is further fed from the state illustrated in FIG. 4.
Figure 6:
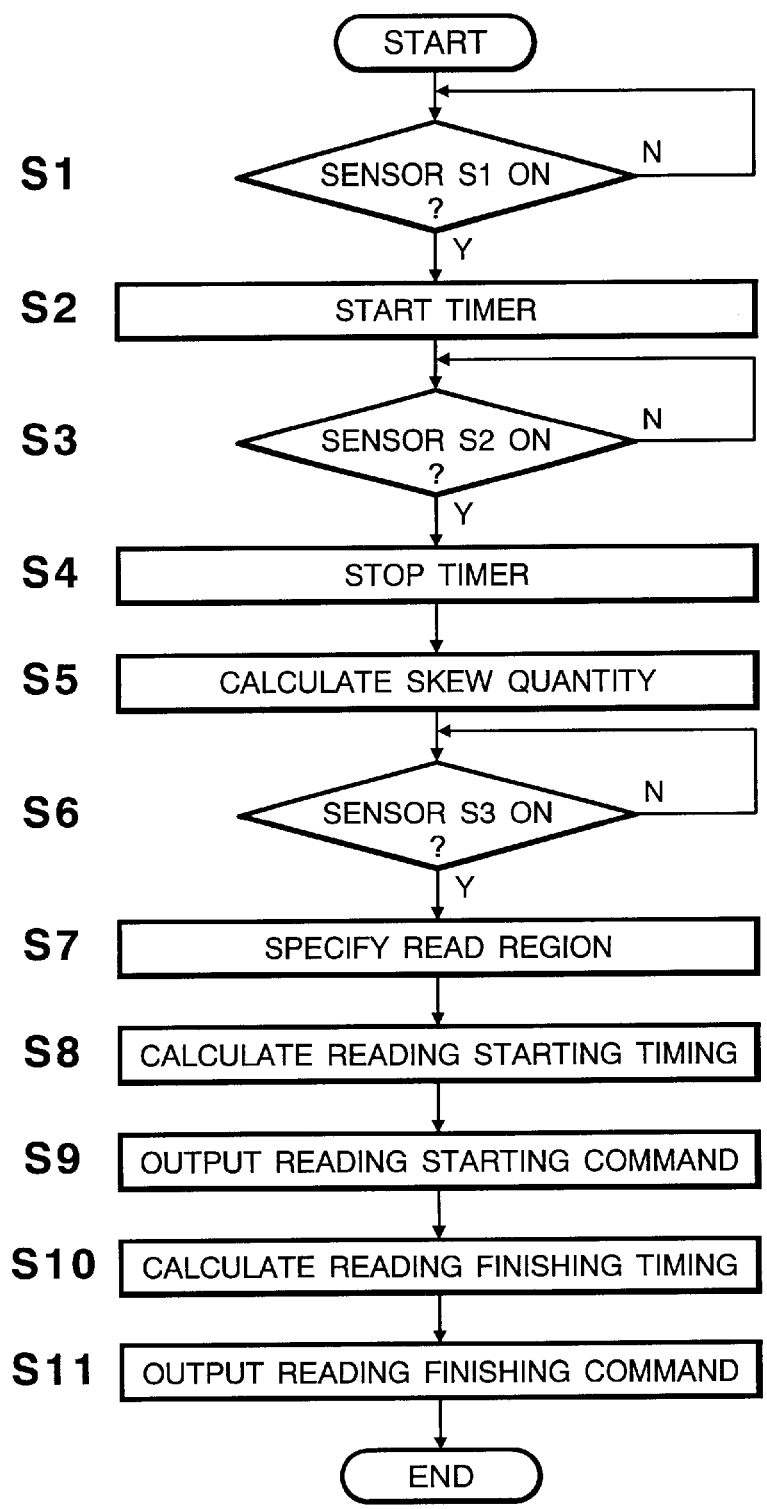
FIG. 6 is a flowchart illustrating operation in the first embodiment according to the present invention.

A first embodiment according to the present invention illustrated in FIGS. 4 to 6 is different from the prior art in that a pair of document end detecting sensors S1 and S2 are disposed on a straight line L1 drawn perpendicularly to a sheet feeding path 5 at a first document end detecting position on the sheet feeding path 5, and further, a third document end detecting sensor S3 is disposed on another straight line L2 drawn perpendicularly to the sheet feeding path 5 at a second document end detecting position downstream of the straight line L1 in a document feeding direction. Since the configurations of a document feeding mechanism 1 and an image processor unit 2 are identical to those in the prior art shown in FIG. 1, their explanation will be omitted. Furthermore, the three document end detecting sensors S1 to S3 are identical to the document end detecting sensor 9 in the prior art. Since the configuration and operation of a reading controller are naturally different from the reading controller 20 in the prior art, they will be explained below from the viewpoint of operation.

The document feeding mechanism 1 is provided with a document size detecting means, not shown, upstream of a feed roller 6. For example, (1) the length of a document is detected by a sensor, not shown, mounted on a sheet feeding tray 3; (2) the width of the document is detected by a mechanism based on a position of a guide, not shown, for restricting the width of the sheet feeding tray 3; or (3) a sensor for detecting that the document passes is provided upstream of the feed roller 6 on the sheet feeding path 5.

The image processor unit 2 can specify a memory size required for reading an image, or can speedily prepare a copying sheet of a required size in the case where the image processor unit 2 is, for example, a copying machine by providing the document size detecting means in the above-described manner.

A reading controller 20 in the image processor unit 2 controls a reading timing by the image reader 7 in response to signals output from the three document end detecting sensors S1 to S3.

Next, explanation will made on operation in the first embodiment.

As shown in FIG. 5, the operation in the case where a document 10 is obliquely fed along the sheet feeding path 5 will be explained in reference to a flowchart illustrated to in FIG. 6. The flowchart of FIG. 6 illustrates processing steps of the reading controller 20. The leading end of the document signifies hereinafter a leading end in the feeding direction.

When the document 10 is fed along the sheet feeding path 5, the sensor S1 disposed on the straight line L1 first detects a side "a" at the leading end of the document 10 (step S1), and then, a detection signal is output to the reading controller 20.

In step S2, a timer incorporated in the reading controller 20 is started.

In step S3, when the other sensor S2 disposed on the straight line L1 detects the side "a" at the leading end of the document 10, the timer is stopped in step S4.

In step S5, a skew quantity of the document 10 is calculated. This skew quantity signifies a degree of obliqueness of the document 10, and it is represented by a sinusoidal value $\sin \theta$ of an angle $\theta$ formed when the side "a" at the leading end of the document 10 crosses the straight line L1. Here, the skew quantity is expressed by a symbol $\theta$.

In steps S1 to S4, since it is detected how much deviation in detection timing of the two document end detecting sensors S1 and S2 is, the reading controller 20 can calculate the skew quantity $\theta$ based on the detection result.

When the document 10 is further fed, the side "a" at the leading end of the document 10 reaches the position of the third document end detecting sensor S3, as shown in FIG. 5. In step S6, a detection signal is output from the sensor S3, and then, is input into the reading controller 20.

The reading controller 20 stores data on the document size previously detected by the document size detector, not shown, and data on the skew quantity calculated in step S5 in an internal memory. Furthermore, it is detected in step S6 that one point at the side "a" at the leading end of the document 10 reaches a detection point of the sensor S3. Since the reading controller 20 previously stores therein the position of the document end detecting sensor S3, it can identify the position of the document 10 at that timing based on the detection signal output from the sensor S3.

The reading controller 20 can put the document size data, the skew quantity data and the document position data together to specify positions of vertexes A, B, C and D of the document 10.

In step S7, a region 12 to be read of a rectangle A'B'C'D' provided with sides parallel to the sheet feeding path 5 and circumscribing a rectangle ABCD is specified in reference to the vertexes A, B, C and D.

In step S8, a reading starting timing is calculated.

At the reading starting timing, the vertex A of the leading end of the document 10 reaches the platen glass 4. The reading controller 20 outputs a reading starting command to the image reader 7 at the timing after a lapse of time corresponding to a distance d1 from the vertex A to the platen glass 4 in FIG. 5 by referring to a timing at which the third document end detecting sensor S3 detects the document 10 (step S9).

Furthermore, in step S10, a timing at which the vertex C at the trailing end of the document 10 reaches the platen glass 4 is calculated as a reading finishing timing. Upon a lapse of that time, the reading operation is finished (step S11).

In accordance with the above-described steps, the image reader 7 reads the read region 12 including the document 10.

As described above, in the method in the first embodiment, even if the document 10 is fed obliquely, the entire image of the document 10 can be read. Consequently, the image contents of the document never becomes deficient in outputting the image.

The image read in accordance with the above-described procedure can be output to a display or a copying sheet in a size corresponding to the read region 12 as it is, or is subjected to rotating processing based on the previously calculated skew quantity, and then, only the image of the document 10 can be output to a display or a copying sheet in a size corresponding to the document 10.

Moreover, although in the first embodiment the circumscribing rectangle A'B'C'D' of the obliquely fed document 10 is specified as the read region 12, only the range of the document 10 may be specified as a region to be read.

In this case, since the border line of the read region is located obliquely with respect to the document feeding direction, the processing by the reading controller 20 becomes complicated.

Additionally, when the skew quantity is large, not the read region including the entire document 10 but a region to be read larger than the document size is set, thereby reducing a deficiently read region.

In the prior art, the read region is determined according to the size of the document, the reading starting timing is determined in reference to only the position detected by the document end detecting sensor. In contrast, in the present embodiment, the skew quantity of the document is detected, and the read region is set based on the detection result so as to reduce or eliminate the deficiently read region of the document.

Figure 7:
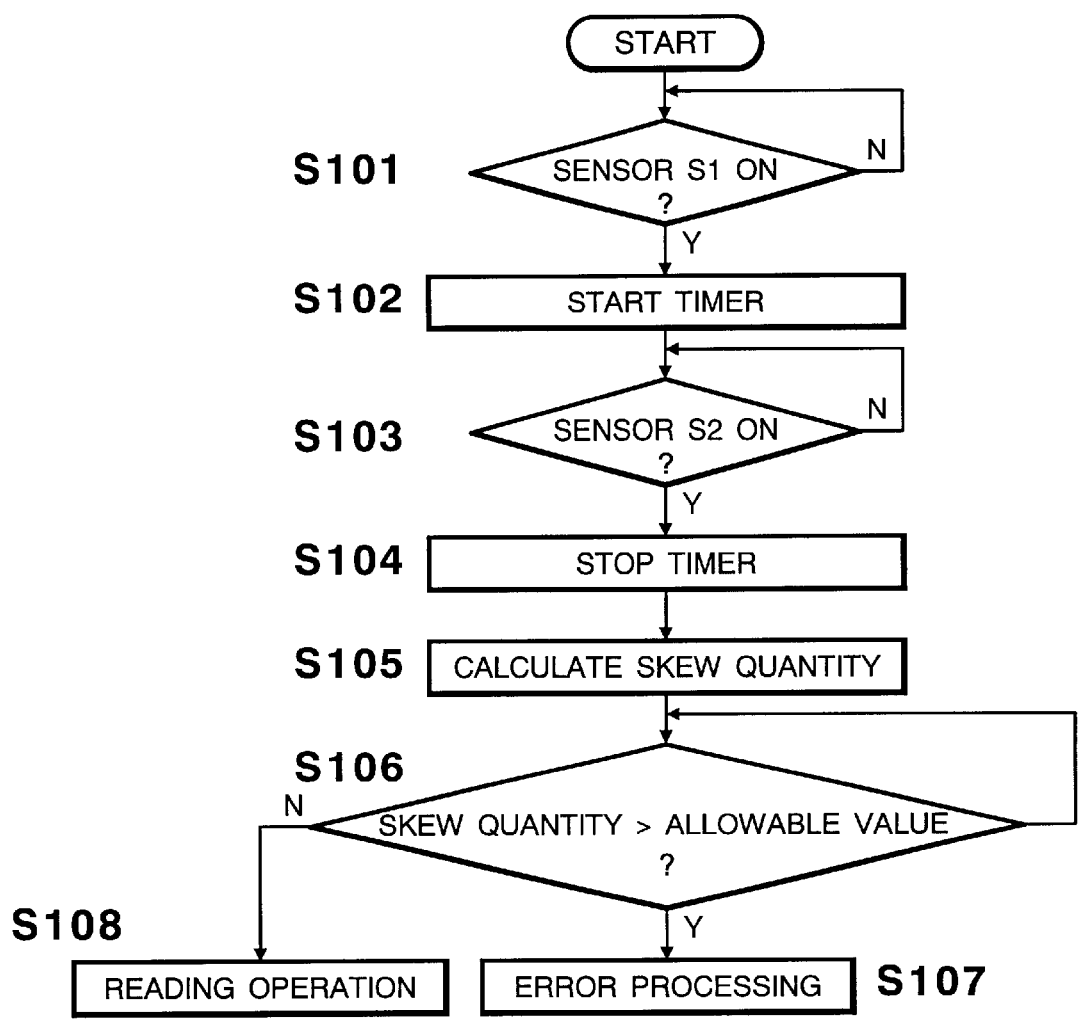
FIG. 7 is a flowchart illustrating operation in a second embodiment according to the present invention.
Figure 8:
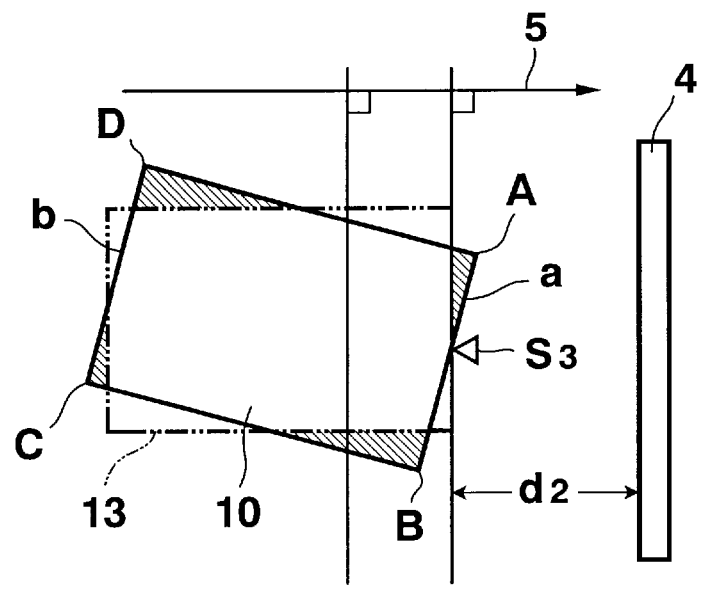
FIG. 8 is a view illustrating a document feeding state and a read region in the second embodiment according to the present invention.

A second preferred embodiment according to the present invention illustrated in FIGS. 7 and 8 is different from the first embodiment in that a reading controller 20 previously sets an allowable value of a skew quantity and it judges an error in the case where an actually detected skew quantity exceeds the allowable value, thereby prohibiting a reading operation.

Here, since the configuration in which document end detecting sensors S1 to S3 are interposed between a feed roller 6 and a platen glass 4 is identical to that in the first embodiment, FIGS. 1 to 4 also are referred to in explaining the second embodiment.

Operation in the second embodiment will be described in reference to a flowchart illustrated in FIG. 7.

A method for detecting a skew quantity of a document 10, which is fed obliquely, by means of the document end detecting sensors S1 and S2 disposed on the straight line L1 illustrated in FIG. 4 is identical to that in the first embodiment. That is, steps S101 to S105 illustrated in FIG. 7 are completely the same as the steps S1 to S5 in the first embodiment illustrated in FIG. 6. A skew quantity $\theta$ is calculated in step S105 illustrated in FIG. 7.

Subsequently, in step S106, it is judged whether or not the skew quantity $\theta$ exceeds the preset allowable value. If it is judged in step S106 that the skew quantity $\theta$ exceeds the allowable value, the routine proceeds to step S107, in which error processing is performed.

In the error processing, the skew quantity of the document 10 is so large that no reading operation hereafter is performed, and further, an error message is displayed or an alarm is given while the document is returned to the sheet feeding tray 3. Otherwise, no reading operation is performed, so that the document 10 may be discharged to the sheet discharging tray 8 via the sheet discharging path 14.

In contrast, if it is judged in step S106 that the skew quantity $\theta$ is the allowable value or less, the routine proceeds to step S108, in which the reading operation is performed. The reading operation is performed by specifying a reading starting timing in response to a signal output from the third document end detecting sensor S3 to thus output a command to an image reader 7, like in the first embodiment. Additionally, a reading finishing command is output in the same manner as in the first embodiment.

In the second embodiment, a region defined according to the size of the document is read without specifying again a region to be read according to the skew quantity.

Furthermore, in the second embodiment, the allowable value is set, and the reading operation is performed only in the case where the skew quantity θ of the document 10 ranges within the allowable value, wherein the reference position at which the reading starting timing is determined cannot be shifted from the position detected by the sensor S3. That is, as illustrated in FIG. 8, the reading operation is started upon a lapse of time corresponding to a distance d2 between the straight line L2 and the platen glass 4 after the document end detecting sensor S3 detects the document end. The reading finishing timing is depended upon the length of the document 10.

At this time, as illustrated in FIG. 8, a region 13 to be read is the same as a document which would be fed without any skew quantity. Consequently, portions hatched in FIG. 8 are deficiently read regions. However, if the allowable value of the skew quantity is appropriately set, the deficiently read region can be kept small, and thus, contained inside the margin of the document.

For example, if the skew quantity θ is so small that a sinusoidal value sin θ is 0.02 or smaller, it is found that the deficiently read region can be contained inside the margin of each of almost all documents without any adjustment of the reading starting position, the read region or the like.

In the above-described manner, the same image as that of the document can be output even without reading part of the margin of the document. Thereafter, the image is rotated based on the skew quantity θ detected by the reading controller 20, is returned to the original direction, and then, is output. Thus, the image can be output in the very same state as the document.

Therefore, as long as the allowable value is appropriately set, the reading operation can be performed at the same timing as that in the prior art even without adjusting the reading starting timing.

Of course, also if the skew quantity is the allowable value or smaller, an adverse influence of the deficient region can be further suppressed by adjusting the reading timing.

Figure 9:
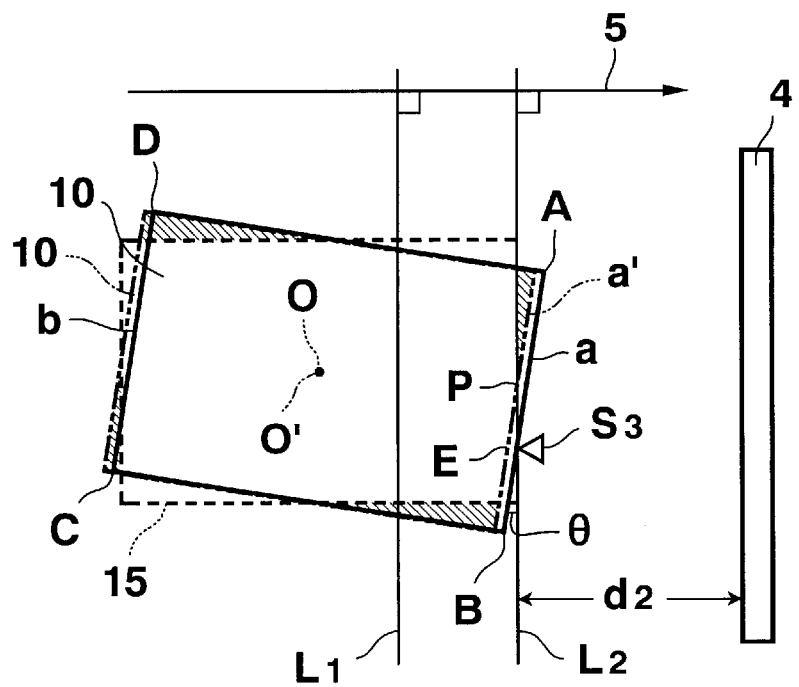
FIG. 9 is a view illustrating a document feeding state and a read region in a third embodiment according to the present invention.
Figure 10:
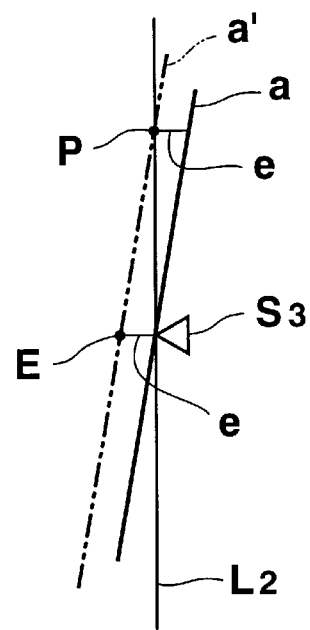
FIG. 10 is a partly enlarged view of FIG. 9.

For example, FIGS. 9 and 10 illustrate a third embodiment according to the present invention, in which a reading timing is adjusted in such a manner that deficiently read regions generated on a document are uniformly located as possible near the periphery of the document.

The third embodiment is different from the above-described second embodiment in that a reading controller 20 controls a reading timing based on a detection signal output from a document end detecting sensor S3 and a skew quantity, but other configurations such as the arrangement of document end detecting sensors S1 to S3 are the same as those in the second embodiment.

Namely, only in the case where a skew quantity θ ranges within an allowable value, a reading operation is performed by adjusting the reading timing.

In FIG. 9, a center "O" shows the center of a document 15 at the time when a side "a" at the leading end of the document 15, which is fed without any skew quantity, i.e., without any obliqueness in a feeding direction of the document 15 indicated by a dot line accords with a straight line L2 on which a detection point of the sensor S3 is located. A two-dot chain line indicates the position of a document 10 at the time when a center "O'" of the document 10 fed with a skew quantity θ accords with the center "O". Reference character P designates an intersection point between a side "a'" at the leading end of the document 10 indicated by the two-dot chain line and a straight line L1.

As described above, the areas of portions of the document 10 laying from the document 15 fed straight are identical to each other laterally and vertically in the state in which the center "O" accords with the center "O'". That is, if the reading operation is started at a timing at which the intersection point P reaches the platen glass 4, deficiently read regions laying from the read region of the document 15 fed straight become uniform laterally and vertically.

Consequently, in the third embodiment, the reading controller 20 adjusts the timing in such a manner that the reading operation is started not from the detection point but from the intersection point P upon receipt of a detection signal output from the document end detecting sensor S3.

For the purpose of explanation of the adjustment, FIG. 10 illustrates the vicinity of the detection point by the sensor S3 of FIG. 9 in enlargement. Reference character E in FIG. 10 designates a point to be actually detected by the sensor S3.

As illustrated in FIG. 10, when the document 10 is fed by a distance "e" in the feeding direction after the center "O'" accords with the center "0", the point E is detected by the sensor S3.

Namely, at the time when the sensor S3 detects the point E, the intersection point P is located by the distance "e" downstream of the straight line L2.

Consequently, if the reading operation is started after a lapse of time corresponding to a distance "d2" from the straight line L2 to the platen glass 4 at the time when the sensor S3 detects the point E, the intersection point P cannot be read, so that it passes by the distance "e" on the platen glass 4.

Therefore, the reading controller 20 outputs a reading starting command after a lapse of time corresponding to a distance obtained by subtracting the distance "e" from the distance d2 when the sensor S3 detects the point E on the side "a" at the leading end.

In this manner, if the reading starting timing is taken at the intersection point P, a deficiently read region at the leading end in the document feeding direction becomes equal to that at the trailing end. Moreover, the deficiently read regions in a lateral direction become equal to each other.

Also in the third embodiment, since the document cannot be read in the case where the skew quantity θ exceeds the allowable value, the skew quantity of the document to be read is remarkably small. Even in this state, the deficiently read regions can hardly become so large that they influence on an output image. However, if the deficiently read regions can be uniformly located near the periphery, it is possible to further suppress the influence of the deficiently read regions on the output image.

The reason of this is that if the deficiently read regions can be uniformly located nearer the periphery of the document since there are margins nearer the periphery, such a possibility becomes stronger that the deficiently read regions are contained inside the margins. The fact that the deficiently read regions are uniformly located nearer the periphery of the document signifies that only one region cannot become deficient inside of the document, thereby reducing a deficient region inside of the margin.

The distance "e" in FIG. 10 can be calculated based on data on the skew quantity θ, the document size and the sensor position by the reading controller 20, which previously stores therein a table corresponding to the skew quantity θ, thereby obviating the need of every calculation if it takes out the distance "e" from the table as required.

Although in the first to third embodiments the two document end detecting sensors S1 and S2 are provided on the straight line L1 for detecting the skew quantity and the third document end detecting sensor S3 is provided for specifying the reading starting timing, either one of the sensors S1 and S2 may also be equipped with the function of the sensor S3 for specifying the reading starting timing.

Furthermore, the means for detecting the skew quantity is not limited to those in the embodiments.

Figure 11:
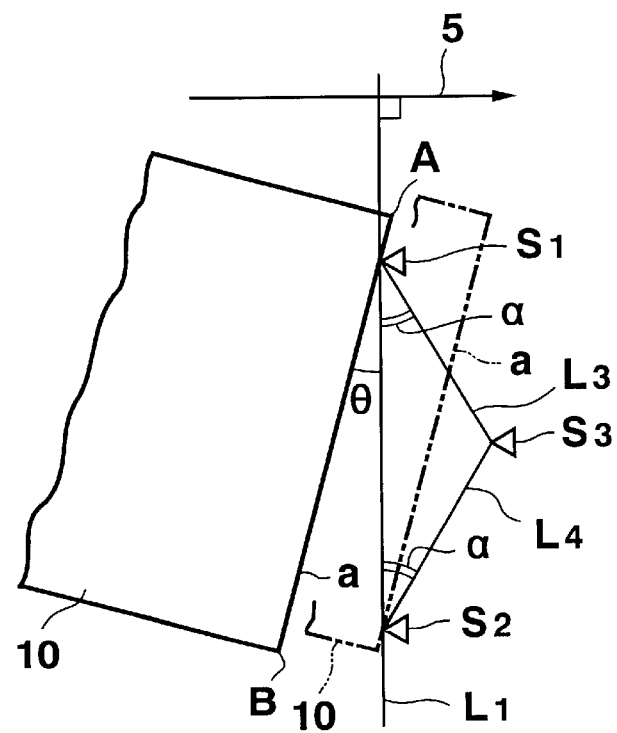
FIG. 11 is a view illustrating the relationship between the arrangement of sensors and a document in a fourth embodiment according to the present invention.

A fourth embodiment illustrated in FIG. 11 is different from the second embodiment in the position at which a third document end detecting sensor S3 is located, but is identical to the second embodiment in other configurations.

As illustrated in FIG. 11, in the fourth embodiment, detection points by a pair of document end detecting sensors S1 and S2 are located on a straight line L1. A detection point by a document end detecting sensor S3 is located at an intersection point of two straight lines L3 and L4 each passing the above-described detection points and forming an angle α with the straight line L1. Here, the angle α represents an allowable value of a skew quantity.

Namely, in the fourth embodiment, the straight line L1 indicates a first straight line according to the present invention; and the detection points by the document end detecting sensors S1 and S2 indicate first and second detection points according to the present invention.

In the meantime, as obvious from the first to third embodiments, the pair of document end detecting sensors S1 and S2 simultaneously detect the document end at the timing when a side "a" at the leading end of a document reaches the straight line L1 in the case where the document 10 is fed straight along a sheet feeding path 5, that is, without any skew quantity.

In contrast, either one of the sensors S1 and S2 earlier detects the document end in the case where the document 10 is fed obliquely.

Here, as illustrated in FIG. 9, a discussion will be conducted about the case where the document 10 is fed while keeping a skew quantity θ smaller than the allowable value α.

When the side "a" at the leading end of the document 10 crosses the straight line L1, the document end detecting sensor S1 first detects the side "a" at the leading end. From this state, the document 10 is fed along the sheet feeding path 5. When the side "a" is fed to a position indicated by a two-dot chain line in FIG. 11, the document end detecting sensor S2 next detects the side "a". When the document 10 is further fed, the third sensor S3 detects the side "a".

In this manner, in the case where the skew quantity θ of the document 10 is smaller than the allowable value α, the sensors S1, S2 and S3 sequentially detect the document end in this order. In the case where the skew quantity θ of the document 10 is equal to the allowable value α, the sensors S2 and S3 detect the document end at the same time.

In contrast, in the case where the skew quantity θ of the document 10 is larger than the allowable value a, the document end detecting sensor S1 detects the side "a" at the leading end, and then, the third document end detecting sensor S3 detects the side "a" before the sensor S2 detects it at the detection point on the straight line L1.

In other words, in the case where the third sensor S3 detects the document end before both of the pair of sensors S1 and S2 detect the document end, it is construed that the skew quantity θ of the document 10 exceeds the allowable value a.

In view of this, a reading controller 20 performs error processing at the timing when the sensor S3 outputs a document end detection signal. The error processing is performed to cancel reading operation hereafter so as to discharge the document 10 outside via the sheet feeding path 5 or a sheet discharging path 14, like in the second embodiment.

In this way, the allowable value a is previously set, and then, the document 10 is not read but discharged to a sheet feeding tray 3 or a sheet discharging tray 8 in the case where the skew quantity θ exceeds the allowable value α, thereby obviating the need of adjustment of a reading timing.

Furthermore, in the fourth embodiment, the detection signal is output from the third sensor S3, so that it is automatically judged whether or not the skew quantity θ exceeds the allowable value α. Consequently, it is possible to omit processing of comparing the calculated skew quantity θ with the allowable value α, and therefore, to simplify the reading controller 20.

Moreover, the allowable value α is set small, so that quite a normal image can be output without rotating the read image at the time of outputting. In this case, there arises an incidental advantage of omission of a step of calculating the skew quantity θ.

Since in the fourth embodiment the detection point by the document end detecting sensor S3 is located at the intersection point of the two straight lines respectively passing the detection points by the sensors S1 and S2 and forming the angle α with the straight line L1, it can be judged whether or not the skew quantity exceeds the allowable value even though the document is tilted in either direction. However, if it is previously found that the document 10 to be fed is tilted in either direction, it can be detected whether or not the skew quantity exceeds the allowable value wherever the sensor S3 is provided on the straight line passing either one of the first and second detection points.

Although in the first to fourth embodiments the descriptions have been given of the document reading apparatus in which the document size detecting means is disposed upstream of the feed roller 6, the document size detecting means may be achieved by a document end detecting sensor disposed at the feed roller 6. In this case, if the document size is detected at a position at which the document is located away from the imager reader 7 as possible, the image processor unit 2 can speedily react, thus increasing the entire processing speed.

According to the present invention, even if the document is fed obliquely, a necessary part of the image of the document can be read without any deficiency.

Furthermore, according to the present invention, the read region is set in accordance with the skew quantity of the document, thus reducing or eliminating the deficiently read region of the document.

Moreover, according to the present invention, the allowable value is previously set, and therefore, the document having the skew quantity in excess of the allowable value is not subjected to the reading operation. Thus, the adjustable range of the image reading timing can be set small, thereby reducing the burden on the reading controller.

Additionally, if the allowable value is appropriately set, an adverse influence of the deficiency at the time of reading can be hardly exerted on the output image even without correcting the reading timing in the case of the skew quantity smaller than the allowable value.

According to the present invention, it is easy to compare the skew quantity of the document with the allowable value. Processing software of the reading controller becomes simple accordingly.

In particular, the deficiently read regions are uniformly located nearer the periphery, thus further reducing the adverse influence of the deficiently read regions on the output image.

What is claimed is:

1. A document reading apparatus comprising:
    a sheet feeding path on which a document is fed onto a platen glass;
    an image reader for reading the document to be fed onto the platen glass;
    a sheet discharging path disposed downstream of the platen glass;
    skew quantity calculating means for calculating a skew quantity of the document with respect to the sheet feeding path; and
    a reading controller for controlling a reading timing by the image reader,
    wherein the reading controller sets a document read region according to the skew quantity calculated by the skew quantity calculating means before the document is read by the image reader.

2. A document reading apparatus as claimed in claim 1, wherein the skew quantity calculating means includes a plurality of document end detecting sensors provided on the way of the sheet feeding path, for detecting the leading end of the document in the feeding direction, and the reading controller, and
    the reading controller calculates the skew quantity of the document with respect to the sheet feeding path based on a deviation of detection timings of the plurality of document end detecting sensors.

3. A document reading apparatus comprising:
    a sheet feeding path on which a document is fed onto a platen glass;
    an image reader for reading the document to be fed onto the platen glass;
    a sheet discharging path disposed downstream of the platen glass;
    skew quantity calculating means for calculating a skew quantity of the document with respect to the sheet feeding path; and
    a reading controller for controlling a reading timing by the image reader,
    wherein the reading controller does not read the document in the case where the skew quantity calculated by the skew quantity calculating means exceeds a preset allowable value and in contrast, controls a document reading starting timing to read the document by referring to a detection timing of any one of a plurality of document end detecting sensors only in the case where the skew quantity ranges within the allowable value.

4. A document reading apparatus as claimed in claim 3, wherein the skew quantity calculating means includes a plurality of document end detecting sensors provided on the way of the sheet feeding path, for detecting the leading end of the document in the feeding direction, and the reading controller, and
    the reading controller calculates the skew quantity of the document with respect to the sheet feeding path based on a deviation of detection timings of the plurality of document end detecting sensors.

5. A document reading method comprising the steps of:
    providing a pair of document end detecting sensors respectively having first and second detection points on a first straight line perpendicular to a document feeding direction;
    providing a third document end detecting sensor having a third detection point on a straight line passing one of the first and second detection points downstream of the first straight line while keeping an angle between the first straight line and the same within a preset allowable value; and
    judging by a reading controller that a skew quantity of a document exceeds the allowable value in the case where the third document end detecting sensor detects a document end after only one of the pair of document end detecting sensors detects the document end and before the other document end detecting sensor detects the document end.

6. A document reading method as claimed in claim 5, wherein in the case where a region corresponding to the size of the document fed on a sheet feeding path is a region to be read and the document is fed while keeping the skew quantity within the allowable value with respect to the sheet feeding path, the image reader adjusts a reading starting timing in such a manner that deficiently read regions lapping from the read region become uniform before and after the document with respect to the feeding direction.

* * * * *